United States Patent [19]

Theis

[11] Patent Number: 5,639,208
[45] Date of Patent: Jun. 17, 1997

[54] ROTARY TURBINE AND ROTARY COMPRESSOR

[75] Inventor: Peter F. Theis, McHenry, Ill.

[73] Assignee: Illinois Technology Transfer LLC, Gurnee, Ill.

[21] Appl. No.: 516,803

[22] Filed: Aug. 18, 1995

Related U.S. Application Data

[63] Continuation-in-part of Ser. No. 206,891, Mar. 1, 1994, Pat. No. 5,518,363, which is a continuation of Ser. No. 904,955, Jun. 26, 1992, abandoned.

[51] Int. Cl.$^6$ ............................ F01D 1/24; F01D 1/36
[52] U.S. Cl. ........................ 415/60; 415/66; 415/90; 416/236 R
[58] Field of Search .......................... 415/2.1, 4.1, 4.2, 415/4.4, 60, 62, 66, 90, 202; 416/235, 236 R, 236 A

[56] References Cited

U.S. PATENT DOCUMENTS

| 215,717 | 5/1879 | Campbell | 415/202 |
|---|---|---|---|
| 546,688 | 9/1895 | Vojacek | 415/60 |
| 829,396 | 8/1906 | Gebhart | 415/60 |
| 962,511 | 6/1910 | Kincaid | 415/60 |
| 1,474,318 | 11/1923 | Conness | 415/60 |
| 1,489,930 | 4/1924 | Clary | 415/90 |
| 3,017,848 | 1/1962 | Bishop | |
| 3,150,816 | 9/1964 | Laing | |
| 4,232,991 | 11/1980 | Gamell | 415/202 |
| 4,422,822 | 12/1983 | Milleron | |

FOREIGN PATENT DOCUMENTS

| 234259 | 6/1964 | Austria | 415/60 |
|---|---|---|---|
| 1186734 | 4/1959 | France | 415/90 |
| 248895 | 6/1926 | Italy | 415/66 |
| 2091810 | 8/1982 | United Kingdom | 415/202 |

*Primary Examiner*—Edward K. Look
*Assistant Examiner*—Christopher Verdier
*Attorney, Agent, or Firm*—Frazzini & Kassatly; Samuel Kassatly

[57] ABSTRACT

A rotary turbine employs rotors that are rotated primarily by the frictional forces of a pressurized medium flowing through a gap that separates the rotors from the stationary housing. The rotors are coupled to a source of pressurized medium that creates a medium flow through the gap. The frictional forces between the flowing medium and the rotors create a torque that rotates the rotors. A compressor is formed of a rotor assembly that includes first and second counter-rotating rotors having substantially smooth surfaces. The rotors are separated by a gap that allows the medium to flow therethrough, with the surface of at least one of the rotors contacting the medium, such that the flow of the medium through the gap is induced by surface friction between the contact surface and the medium.

44 Claims, 5 Drawing Sheets

ROTARY TURBINE AND ROTARY COMPRESSOR

CROSS-REFERENCE TO RELATED APPLICATION

This application is a continuation-in-part of U.S. patent application Ser. No. 08/206,891 filed Mar. 1, 1994, entitled "Radial Turbine", now U.S. Pat. No. 5,518,363 issued May 21, 1996, which is a continuation of U.S. patent application Ser. No. 07/904,955, filed Jun. 26, 1992 now abandoned.

FIELD OF THE INVENTION

The present invention relates generally to turbines and, more particularly, to turbines which do not employ rotor blades.

BACKGROUND OF THE INVENTION

Rotor blades are used in conventional turbines to transfer kinetic energy, in the form of a medium such as gas under pressure, into rotary mechanical motion or, conversely, to transfer the mechanical energy of rotating shafts into the kinetic energy of a compressed medium. As is known by those of elementary skill in the art of engine design, engines may be used with a fuel to generate an area with a medium having a high pressure or a high velocity. The kinetic energy of a medium in the high pressure or high velocity area is then used in a motor to perform work, such as the mechanical rotation of a shaft.

Many engines can, essentially, be "reversed," such that when rotational force is applied to the shaft, the engine may operate as a compressor to convert the mechanical energy of the rotating shaft into the kinetic energy of a compressed medium. In fact, current turbine engines often have both compressor stages and motor driving stages.

Presently available turbines generally include axial rotors with extended blades. A medium under pressure or at high velocity, such as air, is applied to one end of the turbine rotor. The medium flows parallel the axis of the turbine rotor and perpendicular to the radius of the rotor to an area of lower pressure and higher velocity at the other end of the rotor.

The medium comes in contact with rotor blades placed at an angle relative to direction of both the axial travel of the medium and the rotation of the turbine. The rotational thrust is provided by the thrust of the medium on those rotor blades. In multi-stage turbines, stator blades may redirect the medium to flow parallel to the axis of the rotor.

Also well known to those skilled in the art is the water wheel turbine, where the medium flows parallel to the radius of the rotor, and perpendicular to the axis. These devices have blades which are parallel to the axis. The moving medium provides static thrust against those blades to make the rotor turn.

In many conventional turbines, it is often desirable to have low friction between the blades and the medium, as well as between the turbine and the medium. Friction may result in undesirable energy loss and turbulence. The force to move the rotor is not substantially dependent on friction between the medium and the rotor and blades. (The propulsion of the rotor is the "reaction" to the "action" of the medium pressing against the blades.)

Conventional axial turbine rotors and blades are often complex. Consequently, they are expensive and time-consuming to design, manufacture, maintain, and repair.

Moreover, a conventional axial turbine generally reaches its maximum rotational velocity as the speed of the medium, relative to the rotor and stator blades, reaches the speed of sound. If the medium velocity, relative to the rotor velocity, exceeds the speed of sound at any point in the turbine, the turbine can abruptly stop or, in some cases, be destroyed entirely.

The following U.S. patents are illustrative of the relevant art: U.S. Pat. Nos. 3,017,848, 3,150,816, and 4,422,822.

SUMMARY OF THE INVENTION

In a principal aspect, the present invention is a radial turbine in which a medium travels in a "radial" direction, substantially perpendicular to the axes of at least two rotors. There are no substantial rotor or stator blades. If the rotors are of the same size and construction, the rotors rotate at substantially the same speed, but in opposite directions.

By utilizing two counter-rotating rotors with the medium travelling between them, the medium and the surface of both rotors necessarily travel at similar speeds when the rotors are not required to perform work (i.e., a no-load condition). In a loaded condition, however, there may be a speed differential between the rotor and the medium. This differential generates the torque necessary for the rotors to provide power and perform work.

The torque to turn the rotors is developed by the thrust induced from the dynamic friction of the moving medium on the surface, or "skin" of the turbine rotors. In one embodiment of the present invention, the rotor surfaces may be ribbed, grooved, knurled, bushed, or otherwise scored, but are still substantially smooth.

Accordingly, an object of the present invention is an improved turbine. Another object is a turbine that has fewer parts and that is more reliable. A further object is a turbine that is less expensive to manufacture. Still yet another object is a turbine that is lighter weight and less prone to mechanical breakdowns.

Still another object is an improved turbine that may develop substantial torque where the differential between the speed of the medium and the surface speed of the rotors approaches the speed of sound. Still another object is an improved turbine that may enable the velocity of the medium passing through the turbine to exceed the speed of sound.

DETAILED DESCRIPTION OF PREFERRED EMBODIMENTS

Figure 1:
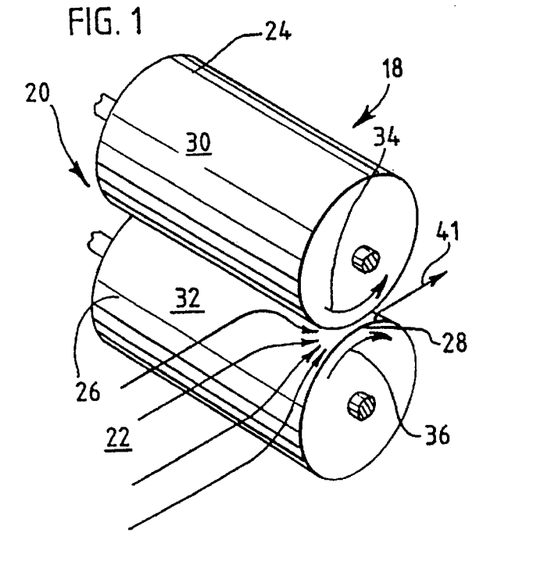
FIG. 1 is an isometric view of a preferred embodiment of the present invention.

Referring to FIGS. 1–13, a first preferred embodiment of the present invention is shown as a radial turbine 18. The radial turbine 18 includes a rotor assembly 20 having a source of a pressurized medium 22, such as air, and first and second rotors 24, 26. As shown in FIG. 1, the first and second rotors 24, 26 are rotatably positioned adjacent each other, but apart sufficiently to define a gap 28 between the rotors 24, 26.

The first and second rotors 24, 26 each define an exterior surface 30, 32, or skin, that is substantially smooth. The surfaces 30, 32 of the rotors 24, 26 are in contact with the medium, since the medium passes through the gap 28.

Although not essential to practicing the present invention, the rotors 24, 26 shown in FIG. 1 each define substantially the same diameter.

The rotors 24, 26 turn in opposite directions, as shown by the rotation arrows 34, 36. As the lower velocity/higher pressure medium enters the gap 28, it accelerates (from the "front" 38 of the turbine 18 (shown on the left side of FIG.2) to the "back" 40 of the turbine 18 (shown on the right side of FIG. 2). Upon reaching the back 40 of the turbine 18, the medium is at a higher velocity, but is at a lower pressure.

Figure 2:
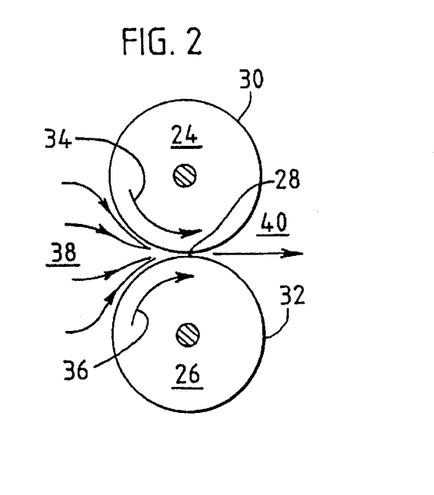
FIG. 2 is a side view of the preferred embodiment shown in FIG. 1.

The gap 28 defines a theoretical central flow line 41 between the front 38 and back 40 of the turbine 18. The flow line is substantially parallel to the direction of movement of the medium in the center of the gap 28.

A physical property of such rotors is that the movement of a particular point on the circumference of the rotor becomes essentially parallel to the direction of flow of the medium (the central flow line) long before the gap 28 is reached by either the particular point on the rotor or the adjacent medium. For example, consider the 60 degree arc, bisected by the gap 28, that a point on the circumference of a rotor travels through. The arc can be divided into a first vector parallel to the center flow line and a second vector perpendicular to the central flow line. In this case, the ratio of the length of the first vector parallel to the central flow line to the second vector perpendicular to the central flow line is over seven to one. In the 40 degrees bisected by the gap 28, the parallel vector is almost 17 times greater than the perpendicular vector.

Accordingly, in a theoretical, no-load, frictionless situation, the rotors 24, 26 will turn so that the surface of each rotor, 26 at the gap 28 approximates the speed of the medium. If the medium and surfaces of the rotors 24, 26 travel at the same speed, there is no significant torque applied to the rotors 24, 26, and hence no mechanical power, being generated by the rotors 24, 26.

On the other hand, when there is a load applied, the rotor will rotate at a lower speed and there will be a speed differential between the medium and the rotor surface. The dynamic force of the medium travelling at high speed against the circumference of the rotor will create torque and generate power.

The force of the torque is a function of the pressure, the surface area, the coefficient of dynamic friction of the surface, and the speed differential. As the rotors rotate, the medium is compressed and accelerated by the frictional forces of the medium and the rotor surface.

The rotational speed of the rotors 24, 26 of course, may be controlled by varying the pressure or velocity of the medium applied to the front 38 of the turbine 18. The turbine 18 depends for its torque, or power, on the torque generated by the dynamic friction of the pressurized medium on the surfaces 30, 32 of the rotors 24, 26 and the velocity differential between the medium in the gap 28 and the velocity of the revolving rotors 24, 26.

It is clear that, even in a theoretical no load situation, the velocity vector of a point on the circumference of a rotor parallel to the central flow line increases as the point approaches the center of the gap. The velocity of the medium is accelerated by the turbine as it approaches the center of the gap. The velocity of the medium may further increase after passing through the gap because of the lower pressure after the gap. However, the velocity of a point on the circumference of the rotor parallel to the flow line is decreasing after it passes the gap. Thus, in a no load situation, there may never be a time when (1) the velocity of a point on the rotor circumference parallel to the flow line and
(2) the velocity of the medium at the gap will be precisely the same, except a few positions (relative to the gap) on the rotor.

On the other hand, when there is a load applied, the rotor surface will be rotating at a lower speed than the medium passing through, and there will be a speed differential between the medium and rotor surface on the rotor surface. The dynamic force of the medium travelling at high speed against the circumference of the rotor will create torque and generate power.

In the preferred embodiment shown in FIGS. 1–2, the two rotors 24, 26 may rotate at the same speed (but in opposite directions) to lower the turbulence of the medium flowing in the gap 28. As the speed differential at the flow line between the rotors and the medium is increased, the torque is increased.

Figure 3:
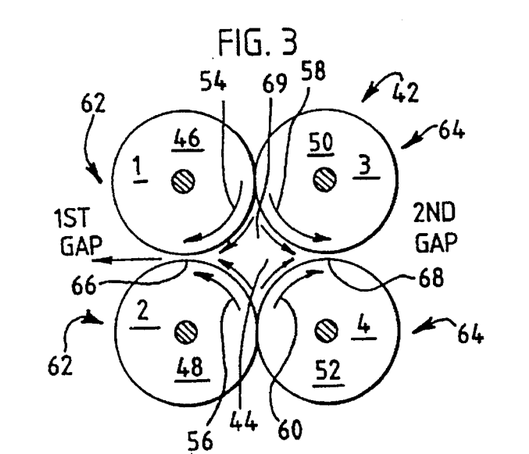
FIG. 3 is a side view of a first alternative to the preferred embodiment shown in FIG. 1, with the turbine utilizing four rotors.

An alternative embodiment of the present invention is shown in FIG. 3 as a turbine 42. The turbine 42 includes a source of pressurized medium 44, as will as first, second, third, and fourth rotors 46, 48, 50, 52 rotating as shown by the rotation arrows 54, 56, 58, 60. The rotors 46–52 are divided into a first pair 62 (consisting of the first and second rotors 46, 48) and a second pair 64 (consisting of the third and fourth rotors 50, 52). The fist pair of rotors 62 again turn in opposite directions, as do the second pair of rotors 64. The first pair of rotors 46, 48 define a first gap 66 between them, and the second pair of rotors 50, 52 define a second gap 68 between them.

The first and third rotors 46, 50 are in very close proximity, or may, in some applications, be in contact with each other, as are the second and fourth rotors 48, 52. Thus, a seal may be formed between the rotors 46 and 50 (and between the rotors 48, 52). In such a case, the amount of the pressurized medium that escapes vertically through the seal is insignificant, if any escapes at all. Generally the medium only escapes through the first and second gaps 66, 68, as shown in FIG. 3.

Alternatively, the turbine 42 shown in FIG. 3 may be constructed such that there is not a substantial seal between the first and third rotors 46, 50, nor between the second and fourth rotors 48, 52. In such a construction, the ambient medium can be drawn into and compressed in a chamber 69 (which partially formed by the rotors 46, 52) by the rotation of the rotor pairs 46 and 50, and 48 and 52.

In this alternative, the counter-rotating cylinders draw the medium between the rotors 46 and 50 and between the rotors 48 and 52. Obviously, the rotors 46–52 would have to rotate to establish the pressure differential necessary to draw in the medium. This is an example of the secondary gaps between the rotors 46, 50 and between the rotors 48, 52 being used as part of a compressor, whereas the other two gaps 66, 68 are being used to introduce fresh air for combustion into the chamber 69 if ignition within the chamber 69 were used to drive the turbine 42.

Figure 4:
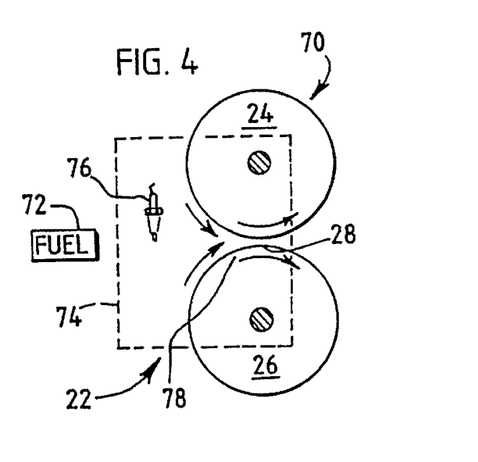
FIG. 4 is a more detailed side view of the preferred embodiment shown in FIG. 1, with the turbine rotor assembly adjacent a pressurized chamber.

A more detailed drawing of the present invention is shown in FIG. 4, in which a fuel source 72 provides fuel to be burned inside of a pressurized chamber 74 with a fuel ignitor 76, shown in FIG. 4 as a spark plug. The chamber 74 includes a port 78. The first and second rotors 24, 26 are adjacent the port 78. A medium is pressurized in the chamber 74 by the ignition of the fuel. Upon pressurization, the medium flows through the port 78 and the gap 28.

In the present invention, as shown in FIGS. 1–4, for example, the turbulence of the medium at the gap 28 is reduced because turbines 24 and 26 have smooth surfaces. This increases the medium's velocity relative to the turbine surface needed to generate a specified torque. Roughness of the turbine rotor surfaces increases turbulence, producing the specified torque at a lower differential of velocity between the medium and the turbine surfaces. Thus, the roughness will effect the velocity differential between the medium velocity and the surface velocity needed to develop a desired torque. In certain cases, such as particular turbine stages, accelerating the medium velocity may be an objective, rather than the generation of torque.

Accordingly, for higher torque with a higher velocity differential, the surfaces of the rotors 24, 26 may be smooth, but with a high coefficient of surface friction, so as to help both minimize the medium turbulence and maximize the friction between the turbine rotor skins 30 32 and the medium.

If the rotors 24, 26 are intended for lower velocity differentials, however, reducing turbulence is less important. Accordingly, under such conditions, where increased torque is required, the surfaces 30, 32 of the rotors 24, 26 may be scored. Such scoring includes, for example, being ribbed, grooved, knurled, or brushed. Nonetheless, despite such scoring, the surfaces 30, 32 of the rotors 24, 26 remain substantially smooth.

Figure 5:
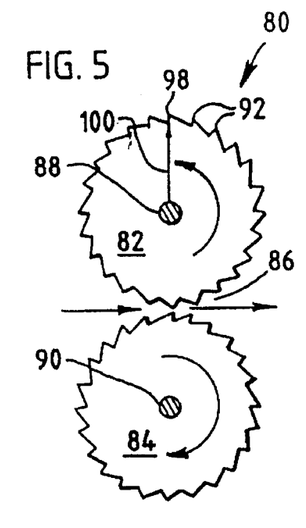
FIG. 5 is a side view of a second alternative to the preferred embodiment shown in FIG. 1, with the turbine rotors incorporating surface ribs.
Figure 6:
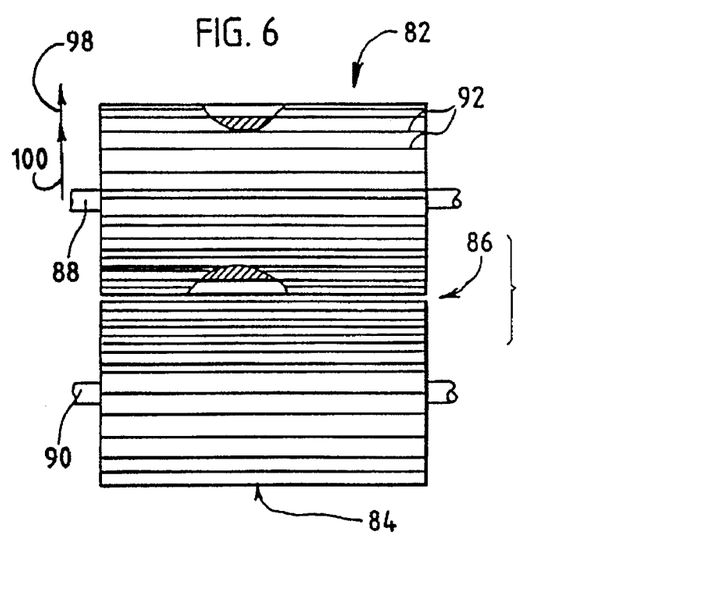
FIG. 6 is a partial cross-sectional, front view of the preferred embodiment shown in FIG. 5.

FIGS. 5 and 6 show another embodiment of the present invention. A turbine 80 includes first and second ribbed rotors 82, 84 and a gap 86 therebetween. Each of the rotors 82, 84 includes a central axis 88, 90.

The rotor 82 is similar to the rotor 84 and is described for purposes of illustrating the structure and operation of both rotors 82, 84. The rotor 82 includes a plurality of ribs 92 extending from the rotor 82. The ribs 92 extend along the length of the rotor 82.

Figure 7:
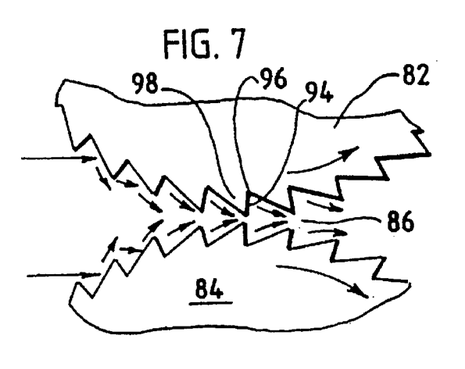
FIG. 7 is an enlarged, partial side view of the preferred embodiment shown in FIG. 5, showing the detail of air flow between the turbine rotors.

As shown in FIGS. 6 and 7, each of the ribs 92 includes a tip 94 and trough 96. The distance from the tip 94 to the trough 96 defines a height 98 of the rib. The rotor 92 further defines a radius 100 from the center of the axis 88 to the trough of the ribs 92.

The two rotors 82, 84 are positioned such that the tips of the first and second rotors 82, 84 are synchronize, moving in a coordinated action to restrict the flow of the medium through the gap 86. The ribs of the two rotors 82, 84 may not touch each other. Thus, the ribs may not form a temporary seal as the ribs momentarily move together. The tips may be either synchronized to approach each other at the gap as shown in FIG. 5, or to be either wholly or partially interleaved.

The ribs 92 have a relatively short height 98. The rib height 98 for the rotor 82 is substantially less than the height of conventional turbine blades, where thrust is dependent on the medium being deflected from the blades. In the present invention, the rib height 98 is no more than one-eight of the rotor radius 100. In yet another preferred embodiment for a different application, the rib height 98 is no more than one-twentieth of the turbine rotor radius 100. In still yet another embodiment of the present invention, the rib height 98 is no more than one-fortieth of the rotor radius 100.

Substantially higher ribs are unnecessary in the present invention. Higher ribs would increase the cost of manufacturing the rotor 82. Moreover, unlike the well-known water wheel, in the present invention, it is the velocity of the medium relative to the tip of the ribs, and not medium statically driving against the troughs of the ribs (where the medium is going substantially slower than it is near the tips) that has the effect of generating torque to drive the rotor 82. Thus, higher ribs may not always be substantially more effective than the lower ribs.

Whether the surface of the rotor is scored or smooth will depend on the intended operating characteristics of the turbine. A scored turbine rotor would be appropriate where there is limited differential between the rotor velocity and the medium velocity. Such a situation would occur where the turbine is designed with a rotor having a low medium speed and where the maximum torque needs to be generated with a minimum velocity differential between the rotors and the medium. On the other hand, where the medium velocity was, for example, a multiple of the speed of sound, the surface could be substantially smoother, because a large differential in velocity between the medium and rotor skin could be tolerated. Within a single turbine, different stages could employ all the above-referenced surfaces.

Figure 8:
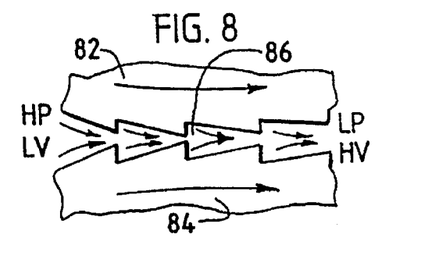
FIG. 8 is more enlarged, partial side view of the preferred embodiment shown in FIG. 7.

FIGS. 7 and 8 show yet additional details of how ribs, or serrations, may be formed at the perimeter of the rotors. The "front," or "left," sides of the ribs are sloping, so that the medium is directed toward the center of the gap 86, in order to maximize the medium's exit velocity. Importantly, however, a component of the force of the medium against the rotor 82 is also directed toward the rotor axis (not shown in FIGS. 7 and 8) to increase thrust. The "back" or "right" side of each rib is substantially collinear with a radius line of the rotor 82, in order to improve the expulsion rate of the medium into the back of the turbine.

As shown in FIGS. 7 and 8, the ribs on the first on the first and second rotors 82, 84 come close to contacting each other and are synchronized so that the ribs coincide, nearly meeting each other at the narrowest part of the gap 86, but still permitting the medium velocity to be greater than the turbine surface velocity. Since the ribs are "short" (relative to the width of the gap 86 between the rotors 82, 84), the ribs do not significantly increase the friction between the pressurized medium and the rotors 82, 84.

Figure 9:
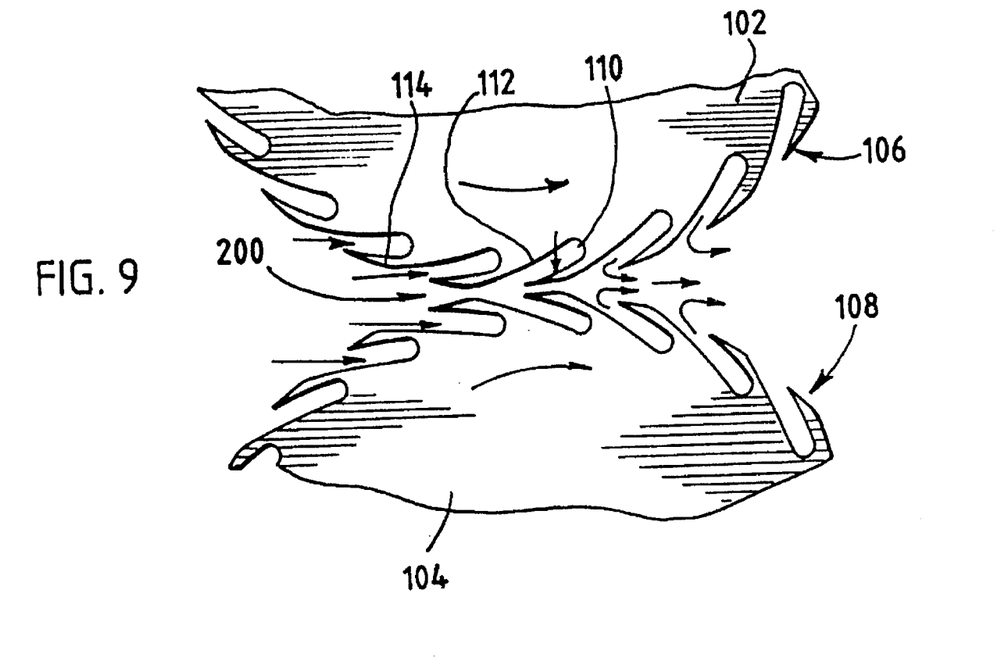
FIG. 9 is a partial side view of a third alternative to the preferred embodiment shown in FIG. 1, with the turbine rotors incorporating surface pockets.

FIG. 9 shows two additional rotors 102, 104 with a gap 200 therebetween. As with the rotors 24, 26, 54–60, 82, and 84, the rotors 102, 104 each define a surface, or skin, 106, 108, and the surfaces 106, 108 are substantially smooth. Rather than including ribs extending from the perimeter, however, the smooth surfaces of the rotors 102, 104 define a plurality of pockets. The pockets receive and store compressed medium from the high pressure side 38 and release it in the low pressure side 40.

Figure 14:
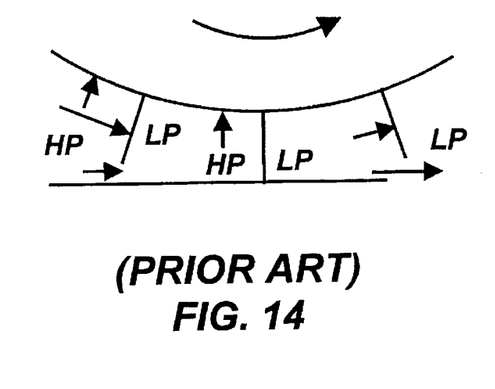
FIG. 14 is a side view of a rotor having conventional turbine blades extending therefrom.

Conventional turbine blades, as shown in FIG. 14, exhaust the high pressure ("HP") medium substantially perpendicularly to the direction of surface travel and parallel to the blade, thereby providing little or no forward thrust. The propulsion of conventional turbine blades instead results from the pressure differential on each side of the blade at the gap. The designation "LP" in FIG. 14 indicates low pressure.

Figure 15:
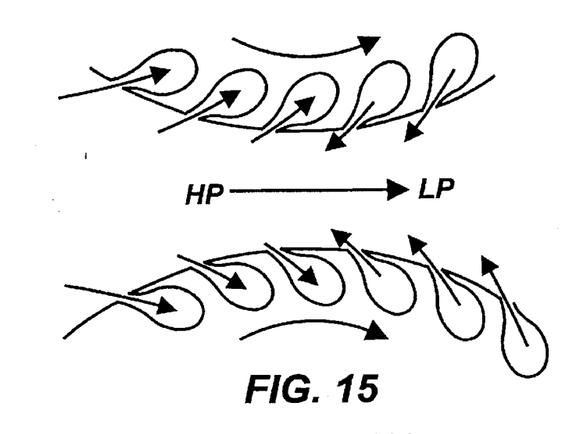
FIG. 15 is a side view of a counter-rotating rotors having pockets formed in the contact surfaces thereof.

In the rotor pockets shown in FIG. 15, the accumulated high pressure ("HP") fluid medium is exhausted as a jet with a force component parallel to the surface of the rotor. The fluid medium can therefore continue to be exhausted past the immediate area of the gap to continue to drive the turbine. The designation "LP" in FIG. 15 indicates low pressure.

The pocket entrance can be formed smaller than the pocket cross-section. The purpose of the opening is to extend the jet action of the exiting medium. With a narrow opening, the medium will be pressurized at the highest pressure point in the rotor's rotation, and could be designed to continue to propel the turbine throughout a substantial portion of its revolution.

Figure 16:
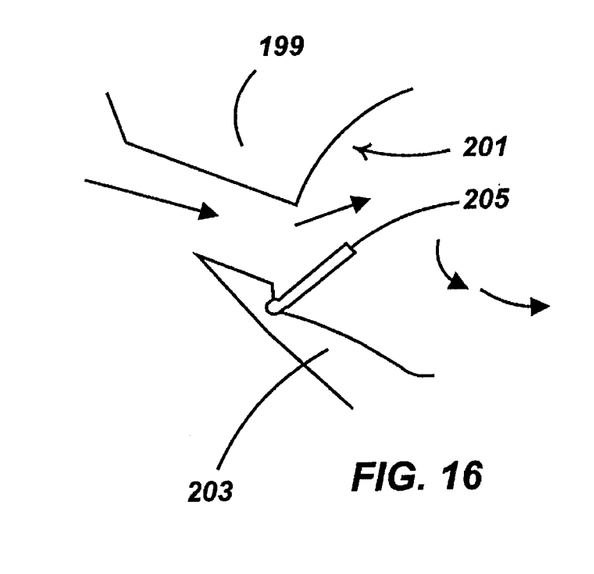
FIG. 16 is an enlarged side sectional view of a rotor having a pocket formed in the contact surface thereof and a flap or door associated with the pocket.
Figure 17:
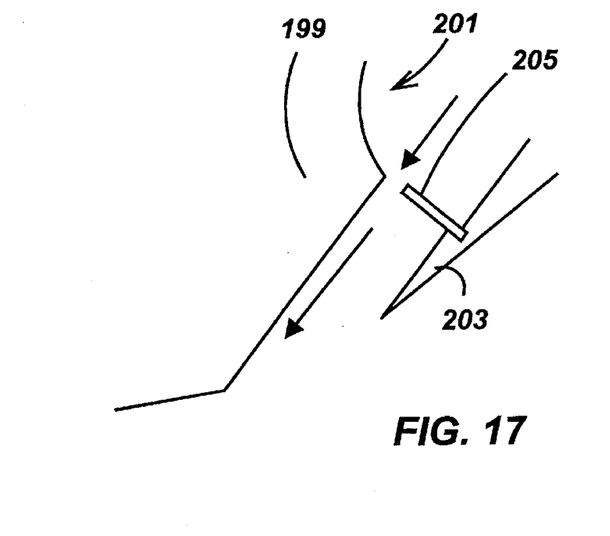
FIG. 17 is an enlarged side sectional view of another rotor having a pocket formed in the contact surface thereof and a flap or door associated with the pocket.

An alternative embodiment is shown in FIGS. 16 and 17. Each pocket 201 of rotor 199 is these embodiments has a flap or door 203 including a valve 205. In the high pressure area shown in FIG. 16, the medium flows quickly into each pocket. The door is thereby opened because the medium pressure outside the pocket is greater than the pressure inside the pocket. When the pocket passes the gap (see FIG. 17), the pressure outside the pocket is lower and the flap closes, thereby reducing the opening size. The release of the jet will be extended for a longer portion of the rotation cycle, or until the pocket again enters a higher pressure area.

The additional thrust of these pocket jets can be useful for changing the characteristics of the turbine. For example, at low rotational speeds, such as at start-up, the pocket jets could help to bring the turbine to operating speed faster. When there are extremely heavy loads which slow the turbine, the pocket jets could provide additional thrust.

The exemplary rotor 102 defines a radius between the center of the rotor 102 and the perimeter 114. The pocket depth 112 is small relative to the radius of the rotor 102. The various depths would depend, among other things, on the design speed differential and the design operating characteristics as previously described.

Figure 10:
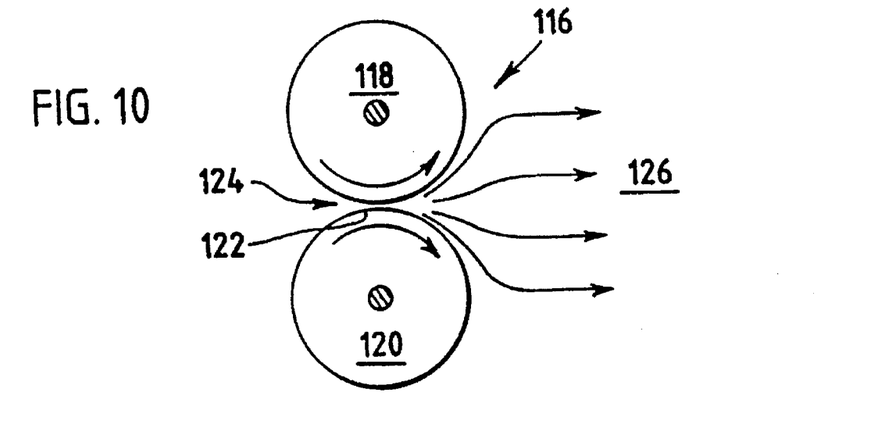
FIG. 10 is a side view of a fourth alternative to the preferred embodiment shown in FIG. 1, with the invention configured as a compressor.

Each of the rotors described above and shown in FIGS. 1–9 may, of course, also be used in conjunction with a compressor rather than a turbine. FIG. 10 shows the present invention the form of a compressor 116. The compressor 116 includes first and second rotors 118, 120 having a gap 122 therebetween. A source of low-pressure medium is at the front 124 of the compressor 116. A source of mechanical power (not shown) rotates the rotors 118, 120.

The rotating turbines compress and accelerate the low pressure fluid medium at the front 124 of the compressor, forcing it through the gap 124. In the high pressure at the back 126 of the compressor, the fluid medium is drawn away from the gap because of surface friction and pressure. The compressor will continue to build pressure in the back 126 until the pressure directly ahead of the gap equals the pressure directly behind the gap. That pressure will be a function of the surface friction and the velocity differential between the fluid medium and the rotors.

Of course, the compressor can also be employed to accelerate the medium instead of building pressure, and multiple stage compressors could accelerate the medium in discrete steps. The fluid medium is accelerated to its highest velocity at the gap. If the pressure is low in the back 126, the medium will not be decelerated as it would be if building pressure were the objective.

The structure of the compressor 116 is, of course, in many respects similar to that of the turbine 18 shown, for example, in FIG. 2. In the compressor 116, however, the rotors 118, 126 are powered to act upon the medium, rather than having the medium apply force to the rotors.

Figure 11:
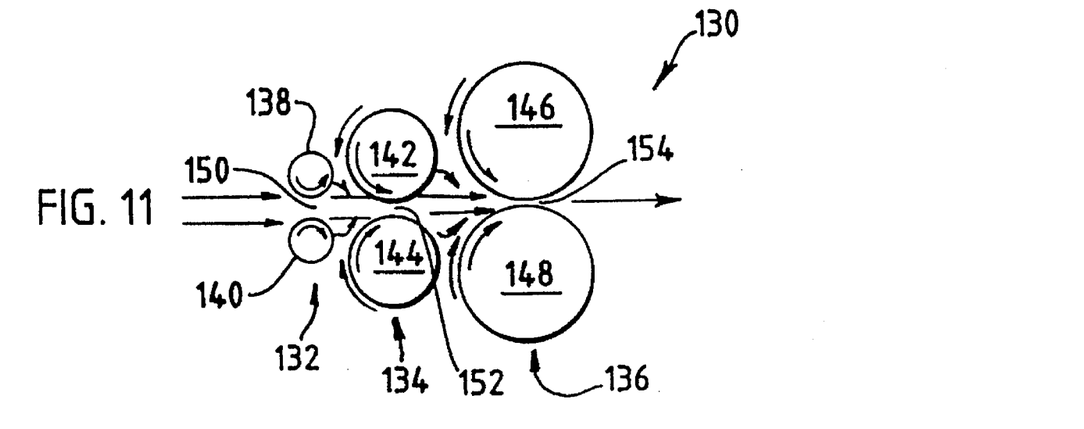
FIG. 11 is a side view of a fifth alternative to the preferred embodiment shown in FIG. 1, with three sets of rotors of varying radii.

Yet another preferred embodiment of the present invention is shown in FIG. 11 as a radial turbine 130 having first, second, and third rotor stages, or sets of rotors, 132, 134, 136 in series. The turbine 130 shown helps maximize the exit velocity of the medium. As shown in FIG. 11, the first, second, and third sets of rotors 132–136 shown in an example being all of the same length, each include two rotors, respectively designated 138 and 140; 142 and 144; and 146 and 148, which define, respectively, first, second, and third gaps 150, 152, 154. The first gap 150 is larger than the second gap 152, which, in turn, is larger than the third gap 154. Moreover, each set of rotors 138–146 defines a rotor radius. The radius of the rotors 138, 140 of the first set 132 is smaller than the radius of the rotors 142, 144 of the second set 134, which, in turn, is smaller than the radius of the rotors 146, 148 of the third set 136.

The rotors in each set, 138, 140; 142, 144; and 146, 148, again rotate in opposite directions. Each of the turbine rotors 138–148 would typically, but not necessarily, be linked, so that the rotational speed of one set of rotors relative to the others was prescribed so the medium velocity at the respective gaps would be increasing.

In the embodiment shown in FIG. 11, if all the rotors were identical in length, the rotational speed of the rotors 138–148 would be the same in all three sets 118–122 if the axle speeds were the same. Because of the increasing radii of the rotors 138–148, however, the surface speed of the rotors of the three sets 132–136 varies. Thus, for a medium flowing through the gaps 150–154, the surface speed of the rotors 138, 140, of the first stage 132 is slower than the surface speed of the rotors 142, 144 of the second stage 134. In turn, the rotational speed of the rotors 146, 148 of the third stage is faster than the surface speed of the rotors 142, 144 of the second stage.

In order to increase the medium velocity through the turbine 130, however, the cross section of the gaps 150–154 decreases from the first to the third stages 132–136. The medium accelerates as it passes through the first, second, and third gaps 150–154. Because of the larger radius of turbine set 136, the surface area of that turbine 132 and 134. Thus, the cross sectional area 154 might be further decreased to increase the differential between the surface velocity of the turbine and the medium, and thereby increase the torque of the turbine set 154.

In such a case, the first and second sets of rotors 132, 134 may effectively act both as compressor rotors, to pull the medium between them and into the turbine, and as power turbine rotors, which rotate as a result of the medium passing through the gap 150. Alternatively, the first set of rotors 132 may, for example, act wholly as compressor rotors, pulling in medium through the gap 150 (and/or through the secondary gap between the first and second sets of rotors 134, 136). In this case, the second and third sets of rotors 136, 138 may act as power turbine rotors.

Figure 12:
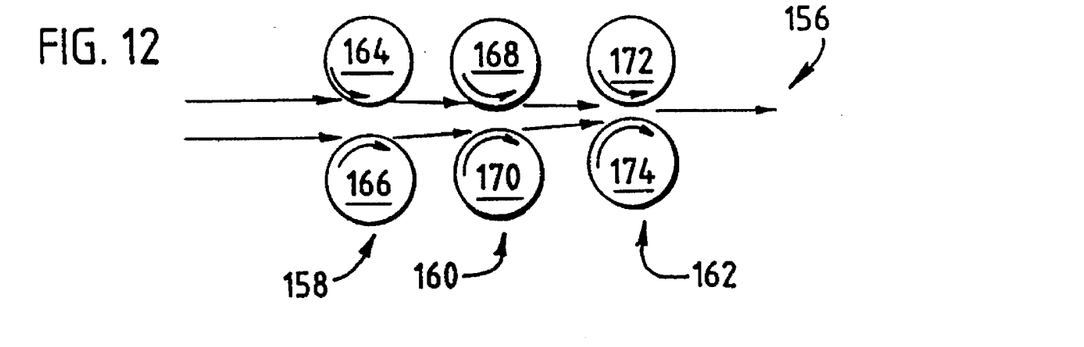
FIG. 12 is a side view of a sixth alternative to the preferred embodiment shown in FIG. 1 with three sets of rotors of substantially the same radius.

FIG. 12 similarly shows a turbine 156 with first, second, and third rotors stages 158, 150, 162. The first, second and third stage rotors, respectively designated 164, 166; 168, 170; and 172, 174, each have substantially similar radii and length. Thus, as shown in FIG. 12, the first stage rotors 164, 166 have a slower rotational speed than the second stage rotors 168, 170, which, in turn, have a slower rotational speed than the third stage rotors 172, 174.

The gaps between the rotors 164–174 may vary, as in the turbine shown in FIG. 11, or may all be substantially the same. As before, when the size of the gap between the rotors decreases, the velocity of the medium through the gap, as well as the speed of the adjacent rotors increases. Also, as before, the rotors 164–174 of the turbine 156 may all be power turbine rotors, of some (such as rotors 164, 166) may be compressor rotors and others (such as rotors 168–174 may be power turbine rotors, or some rotors (such as rotors 168, 170) may function both as turbine rotors and as compressor rotors.

Figure 13:
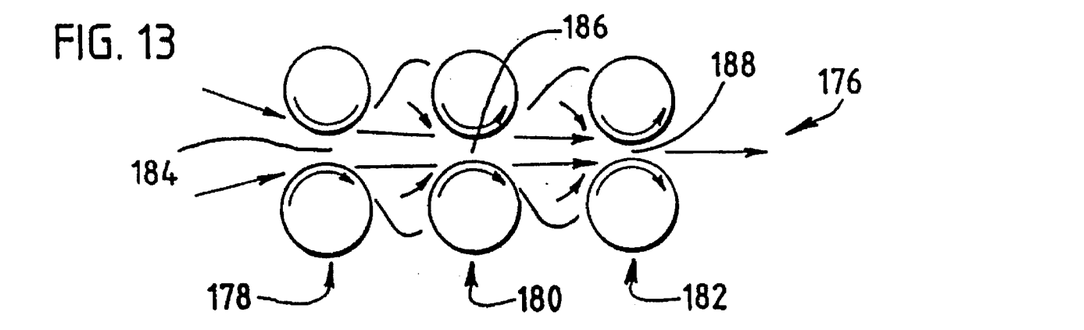
FIG. 13 is a side view of a seventh alternative to the preferred embodiment shown in FIG. 1 with three sets of rotors and a fuel injector positioned adjacent the second set of rotors.

FIG. 13 shows yet another turbine 176 having first, second, and third rotor stages 178, 180, 182 with, respectively, first, second, and third gaps 184, 186, 188. A medium may be injected between the second and third rotor stages 180, 182 or, in another embodiment, between the first and second rotor stages 180, 182. Thus, for example, the first rotor stage 178 may be used to accelerate the medium into the turbine 176. The medium may then be mixed with a fuel also injected between the first and second rotor stages 178, 180. The mixture may then be ignited to drive the second and third rotor stages 180, 182.

Thus, for example, if the fuel were a hydrocarbon, accelerated air injected into the turbine 176 from the first stage 178 could be used to ignite the fuel when it is injected between the first and second rotor stages 178, 180. Thus, the first rotor stage 178 of the turbine 176 function as a conventional motor, changing the kinetic energy of the ignited hydrocarbon fuel into the mechanical energy of the rotating rotors of the second and third stages 180, 182.

The present invention may be used in a variety of applications where low complexity, high reliability, and high power-to-weight ratios are required. Additionally, this engine may have particular applicability where it is desired to have a high exit velocity of the medium, such as in aircraft jets.

In this specification although the drawings and specifications refer to a cylindrical turbine, it is to be under stood that the scope of the invention includes counter rotating devices that are not cylindrical. Such a device, for example, could include an exterior surface or skin rotating over a series of rollers that may not follow a circular path. The word "turbine" includes non-circular turbines.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A compressor comprising:
   a source of a fluid medium;
   a rotor assembly including first and second counter-rotating rotors having substantially smooth surfaces, said rotors separated by a gap that allows said medium to flow through said gap, the surface of at least one of said rotors contacting said medium, whereby flow of said medium through said gap is induced by surface friction between said contact surface and said medium.

2. A compressor comprising:
   a source of a fluid medium; and
   a rotor assembly including first and second counter-rotating rotors separated by a gap that allows said medium to flow through said gap at a velocity less than the surface velocity of said rotors, each of said rotors having a substantially smooth surface, whereby said medium is accelerated by surface friction between said surface and said medium.

3. The compressor of claim 2 wherein each of said rotors defines a rotor radius, each of said surfaces including a plurality of ribs, each of said ribs defining a rib height, said rib height being less than one-eighth of said rotor radius.

4. The compressor of claim 3 wherein said rib height is less than one-twentieth of said rotor radius.

5. The compressor of claim 4 wherein said rib height is less than one-fortieth of said rotor radius.

6. The compressor of claim 2 wherein each of said rotors defines a rotor radius, each of said surfaces including a plurality of pockets, each of said pockets defining a pocket depth, said pocket depth being less than said rotor radius.

7. A compressor comprising:
   a fluid medium; and
   a rotor assembly including first and second counter-rotating rotors separated by a gap that allows said medium to flow through said gap at a velocity less than the surface velocity of said rotors, at least one of said rotors having a substantially smooth surface, whereby said medium is compressed by surface friction between said surface and said medium.

8. The compressor of claim 7 wherein each of said rotors has a substantially smooth surface.

9. The compressor of claim 7, wherein said at least one of said rotors includes a plurality of ribs.

10. The compressor of claim 7, wherein said at least one of said rotors includes a plurality of pockets.

11. A multiple stage compressor comprising:
    a plurality of rotor assemblies, at least one of said assemblies including first and second counter-rotating rotors separated by a gap that allows a fluid medium to flow through said gap at a velocity less than the surface velocity of said rotors, at least one of said rotors having a substantially smooth surface, whereby said fluid medium is accelerated by surface friction between said surface and said medium.

12. The multiple stage compressor of claim 11 wherein said surface includes a plurality of ribs.

13. The multiple stage compressor of claim 11 wherein said surface includes a plurality of pockets.

14. The multiple stage compressor of claim 11 wherein each of said rotors has a substantially smooth surface.

15. The multiple stage compressor of claim 11 wherein at least some of said ribs include sloped surfaces and wherein said fluid medium is forced against said sloped surfaces.

16. The multiple stage compressor of claim 11 wherein at least a second one of said assemblies includes a rotor having a surface with a plurality of ribs.

17. The multiple stage compressor of claim 11 wherein at least a second one of said assemblies includes a rotor having a surface with a plurality of pockets.

18. The multiple stage compressor of claim 13 wherein said pockets provide a temporary relatively high pressure storage for at least a portion of said fluid medium.

19. The multiple stage compressor of claim 18 wherein said fluid medium is discharged from said pockets at a relatively lower pressure.

20. The multiple stage compressor of claim 13 wherein at least one of said pockets includes a valve.

21. A method of compressing a fluid medium comprising the step of:

allowing the fluid medium to flow in a gap defined by first and second counter-rotating rotors, at least one of said rotors having a substantially smooth surface in contact with said fluid medium, such that the surface of the rotor in contact with said fluid medium causes said fluid medium to flow through said gap.

22. The method according to claim 21, wherein the surface of the rotor causes said fluid medium to flow by increased surface friction at a low speed differential between the rotor surface and the fluid medium.

23. A method of compressing a fluid medium comprising the step of:

allowing the fluid medium to flow in a gap defined by first and second counter-rotating rotors at a velocity less than a surface velocity of said rotors, at least one of said rotors having a substantially smooth surface in contact with said medium, such that the fluid medium is compressed by surface friction between said surface and the fluid medium.

24. The method according to claim 23, wherein the fluid medium is compressed by increased surface friction at a low speed differential between the rotor surface and the fluid medium.

25. The method according to claim 23, wherein said fluid medium is compressed before and after said gap.

26. The method according to claim 23, wherein the velocity of the fluid medium at said gap is less than the surface velocity of said rotors at said gap.

27. A multiple stage compressor for compressing a medium, comprising:

a plurality of rotor assemblies, at least one of said assemblies including first and second counter-rotating rotors separated by a gap, at least one of said rotors having a substantially smooth surface, the surface of at least one of said rotors contacting said medium, whereby flow of said medium through said gap causes surface friction between said contact surface and said medium;

said surface including a plurality of pockets; and at least one of said pockets includes a valve.

28. A turbine for use with a source of pressurized fluid medium, comprising:

a rotor assembly including at least first and second counter-rotating rotors and third and fourth counter-rotating rotors, each of said rotors having a surface in contact with said medium, at least a portion of said surfaces of said rotors providing resistance to said medium passing at a higher velocity;

said first and second rotors being positioned apart with a first gap therebetween;

said third and fourth rotors being positioned apart with a second gap therebetween;

said medium passing between said first and second gaps at a velocity greater than the surface velocity of said rotors, whereby said rotors are rotated by the pressure of said medium and surface friction between said contact surfaces and said medium; and at least one of said rotors defining a rotor radius including a plurality of ribs, each of said ribs defining a rib height, said rib height being less than one-eighth of said rotor radius.

29. The turbine of claim 28, wherein said rib height is less than approximately one-twentieth of said rotor radius.

30. The turbine of claim 29, wherein said rib height is less than approximately one-fortieth of said rotor radius.

31. The turbine of claim 28, wherein the surface of at least one of said rotors is scored.

32. The turbine of claim 28, wherein at least said first and second counter-rotating rotors include a plurality of ribs, each of said ribs having a tip and a trough, whereby said medium passes between the tips of said first and second counter-rotating rotors at a higher velocity than the surface velocity of either of said rotors.

33. A turbine comprising:

a source of fluid medium;

a rotor assembly including first and second counter-rotating rotors having substantially smooth surfaces, said rotors being separated by a gap that allows said medium to flow through said gap, the surface of at least one of said rotors contacting said medium, whereby flow of said medium through said gap is induced by surface friction between said contact surface and said medium.

34. The turbine according to claim 33, wherein said fluid medium is caused to flow through said gap at a speed approaching, equaling, or exceeding the speed of sound.

35. A turbine comprising:

a source of fluid medium;

a rotor assembly including first and second counter-rotating rotors separated by a gap that allows said medium to flow through said gap at a velocity greater than the surface velocity of said rotors, each of said rotors having a substantially smooth surface, whereby said medium is accelerated by surface friction between said surface and said medium.

36. The turbine according to claim 35 wherein said fluid medium is caused to flow through said gap at a speed approaching, equaling, or exceeding the speed of sound.

37. A turbine comprising:

a fluid medium;

a rotor assembly including first and second counter-rotating rotors separated by a gap that allows said medium to flow through said gap at a velocity greater than the surface velocity of said rotors, at least one of said rotors having a substantially smooth surface, whereby said medium is compressed by surface friction between said surface and said medium.

38. The turbine according to claim 37, wherein said fluid medium is compressed before said gap and decompressed after said gap.

39. The turbine according to claim 37 wherein said fluid medium is caused to flow through said gap at a speed approaching or exceeding the speed of sound.

40. A method of decompressing a fluid medium comprising the step of:

allowing the fluid medium to flow in a gap defined by first and second counter-rotating rotors, at least one of said rotors having a substantially smooth surface in contact with said medium, such that the surface of the rotor in contact with said fluid medium causes said fluid medium to flow through said gap.

41. A method of decompressing a fluid medium comprising the step of:

allowing the fluid medium to flow in a gap defined by first and second counter-rotating rotors at a velocity greater than a surface velocity of said rotors at said gap, at least one of said rotors having a substantially smooth surface in contact with said medium, such that the fluid medium is decompressed by surface friction between said surface and the fluid medium.

42. The method according to claim 41, wherein the fluid medium flows through said gap at a higher velocity than a surface velocity of the rotor at said gap.

43. A method of accelerating a fluid medium comprising the step of:

allowing the fluid medium to flow in a gap defined by first and second counter-rotating rotors, at least one of said rotors having a substantially smooth surface in contact with said fluid medium, such that the surface of the rotor in contact with said fluid medium causes said fluid medium to flow through said gap.

44. The method according to claim 43, wherein said fluid medium is caused to flow through said gap at a speed approaching, equaling, or exceeding the speed of sound.

* * * * *